United States Patent [19]

Naselli et al.

[11] Patent Number: 5,258,602
[45] Date of Patent: Nov. 2, 1993

[54] TECHNIQUE FOR PRECISION TEMPERATURE MEASUREMENTS OF A SEMICONDUCTOR LAYER OR WAFER, BASED ON ITS OPTICAL PROPERTIES AT SELECTED WAVELENGTHS

[75] Inventors: Charles Naselli; Larry E. Reed; Avraham Amith, all of Roanoke, Va.

[73] Assignee: ITT Corporation, New York, N.Y.

[21] Appl. No.: 671,343

[22] Filed: Mar. 19, 1991

Related U.S. Application Data

[60] Continuation-in-part of Ser. No. 585,655, Sep. 20, 1990, Pat. No. 5,170,041, which is a division of Ser. No. 399,729, Aug. 28, 1989, Pat. No. 5,167,452, which is a division of Ser. No. 157,196, Feb. 17, 1988, Pat. No. 4,890,933.

[51] Int. Cl.$^5$ ............................................. H05B 1/02
[52] U.S. Cl. .................................. 219/497; 219/502; 219/494; 374/123; 374/161
[58] Field of Search ............ 219/497, 494, 502, 121.43, 219/121.44; 374/121, 123, 161

[56] References Cited

U.S. PATENT DOCUMENTS

| | | | |
|---|---|---|---|
| 3,672,221 | 6/1972 | Weil | 374/161 |
| 4,302,970 | 12/1981 | Snitzer et al. | 374/161 |
| 4,890,933 | 1/1990 | Amith et al. | 374/123 |
| 5,098,199 | 3/1992 | Amith | 374/123 |

Primary Examiner—Mark H. Paschall
Attorney, Agent, or Firm—Arthur L. Plevy; Patrick M. Hogan

[57] ABSTRACT

A method for sensitive and precise determination of the temperature of a thin layer or wafer of bandgap material, without requiring contact to the layer or to the wafer, is based on selection of optical wavelength or wavelengths and the measurements of transmittance through the sample at such wavelength(s). The relationship between the temperature variations of the absorption coefficient, whether determined by band-to-band absorption or a totally different mechanism, and the measured transmittance, provide an indication of the sample temperature, without regard to the ambient temperature. The method prescribes how to select the wavelength(s) based both on the intrinsic properties of the material and on the practical considerations of the measurement situation.

9 Claims, 7 Drawing Sheets

TECHNIQUE FOR PRECISION TEMPERATURE MEASUREMENTS OF A SEMICONDUCTOR LAYER OR WAFER, BASED ON ITS OPTICAL PROPERTIES AT SELECTED WAVELENGTHS

CROSS-REFERENCE TO RELATED APPLICATIONS

This application is a continuation-in-part application of Ser. No. 07/585,655 filed Sep. 20, 1990 now U.S. Pat. No. 5,170,041 and which application is a division of application Ser. No. 07/399,729 filed Aug. 28, 1989 now U.S. Pat. No. 5,167,452 and which was a division of application Ser. No. 07/157,196, filed Feb. 17, 1988, now U.S. Pat. No. 4,890,933.

FIELD OF INVENTION

The present invention relates to measuring as well as controlling the temperature of a layer or a wafer of bandgap material. More particularly, the invention is applicable to a method for the precise temperature measurement of a semiconductor layer or wafer by utilizing the optical absorption coefficient of this bandgap material to measure and control the temperature of the same. In conjunction, the invention prescribes how to select and utilize the wavelength of the energy to be transmitted through the sample material to assist in determining the temperature of the same. Especially useful is the fact that the bandgap material workpiece can be used as a sensor for another object with which it is placed in intimate contact. As an example of the method's application, GaAs is chosen as a semiconductor whose bandgap shrinks as the temperature increases enabling the invention to take advantage of the dependence of the optical absorption coefficient, $\alpha$, on the semiconductor's bandgap, $E_g$, which in turn, depends on temperature. The present invention employs optical measurements which have strong dependence on the coefficient-of-absorption, $\alpha$, such as optical transmittance or reflectance. Furthermore, for a given temperature range of interest the invention selects a spectral band of operation wherein the dependence of $\alpha$ on $E_g$ (and through it on temperature) is the strongest.

BACKGROUND AND SUMMARY OF THE INVENTION

Numerous steps are necessary in processing materials, in particular semiconductors, where no contacts to the workpiece are allowed. Among such processes are those carried out in vacuum chambers, and where cleanliness and perfection of the sample and its surface are essential. Optical methods provide the means to probe the sample without physical contact. Optical transmittance through the sample depends on the coefficient of absorption, $\alpha$, as does the reflectance off the sample's surface (in those cases where the Fresnel coefficient of reflectivity does not vanish, and where the sample is quasi-transparent in the spectral range employed).

The use of a transmission method to overcome the limitations of the pyrometer has been described in some detail in U.S. Pat. No. 4,890,933 entitled TRANSMISSION METHOD TO DETERMINE AND CONTROL THE TEMPERATURE OF WAFERS OR THIN LAYERS WITH SPECIAL APPLICATION TO SEMICONDUCTORS issued on Jan. 1, 1990 to A. Amith et al and assigned to the assignee herein. In that patent, there is described a method of accurately determining the temperature of a thin layer of bandgap material without requiring contact to the layer. The method uses optical radiation through the layer to detect optical absorption by the layer. The relationship between the temperature varying bandgap energy and the resulting optical absorption characteristics provides an indication of temperature, independent of ambient temperature. Reference is also made to a co-pending patent application, Ser. No. 399,729 filed Aug. 28, 1989 which has been allowed and which is a divisional also of the application resulting in the above-noted patent and having the same title, inventors and assignee.

The present invention overcomes the severe drawbacks associated with any temperature-sensing method which requires contact to the workpiece. For all but thoroughly opaque samples, the invention also overcomes the fundamental limitations of pyrometric techniques which depend on measuring black-body (or gray-body) radiation. The latter technique measures the sample's emittance, which is extremely small unless the transmittance and the reflectance are themselves very small. This is a consequence of Kirchoff's Law. The inventive method herein discloses how to select the optimum optical wavelength to be transmitted through, or reflected off of the material sample so that the temperature of the sample can be determined accurately. The method also enables the user to investigate the bandgap effect of the material sample. As the example for this invention and the description that follows, the transmittance through the sample (GaAs) will be employed.

BRIEF DESCRIPTION OF THE DRAWINGS

FIG. 8 is a plot showing the normalized optical transmission of different wavelengths.

FIG. 9 is a plot showing unnormalized optical transmission of different wavelengths.

DETAILED DESCRIPTION OF THE DRAWINGS

The properties of the material on which this invention is based are 1) the dependence of the bandgap on temperature, 2) the temperature-dependence of the band-to-band optical absorption which results from 1, and 3) optical absorption due to other physical effects, such as free-carrier absorption.

Figure 1A:
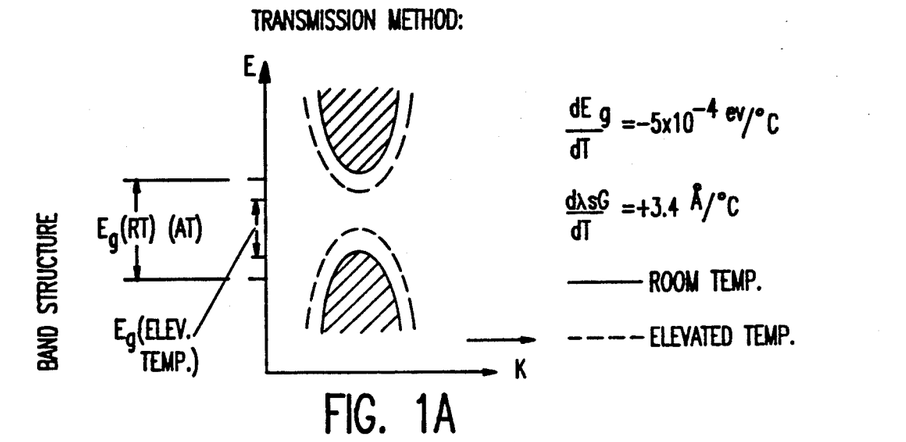
FIG. 1a is a plot showing the change in the bandgap of GaAs as a function of temperature.
Figure 1B:
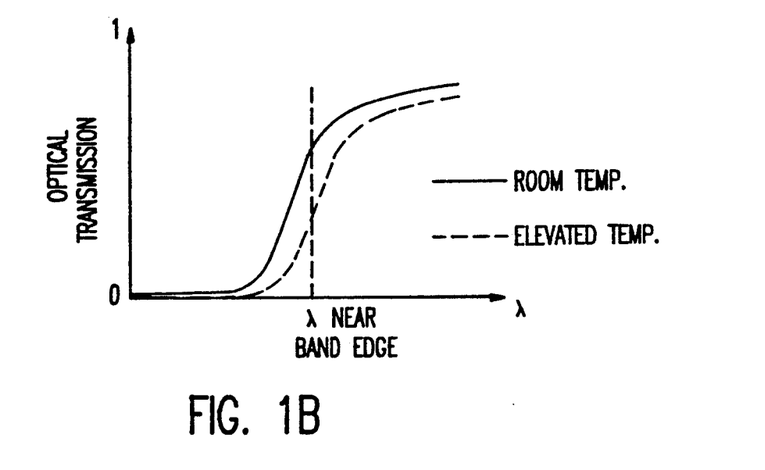
FIG. 1b is a plot showing the optical transmission of GaAs as a function of temperature.

FIGS. 1a and 1b shows the behavior of the bandgap and the concomitant behavior of band-to-band absorption, where GaAs was chosen as the example. FIG. 1a shows the change in the bandgap as function of temperature, and FIG. 1b shows the generic temperature-behavior of the optical absorbance at various wavelengths. The approximate quantitative description of the effect summarized in the Equations 1 through 4, is set forth as follows.

The expression for transmittance through the sample is approximated, thus:

$$I = I_o e^{-\alpha t} \quad (1)$$

where I and $I_o$ are the transmitted and the incident light intensities, respectively; $\alpha$ is the absorption coefficient and t is the sample thickness.

{In the case where this method is applied to the reflectance off the sample, the following full expression must be employed:

$$I = I_0 \frac{(1-R)^2 e^{-\alpha t}}{1 - R^2 e^{-2\alpha t}}$$

where R is the reflection coefficient, and the absorbing layer of thickness t is bound by material whose refractive index is the same on both sides}.

It is apparent that the sensitivity of the measurement to the sample temperature depends on the sensitivity of the transmitted intensity I to temperature. That, in turn, depends on the temperature-sensitivity of the absorption coefficient $\alpha$. The latter sensitivity comes through the dependence of $\alpha$ on the semiconductor's energy bandgap $E_g$, which is itself temperature-dependent. The temperature-sensitivity of the bandgap is an intensive and invariant property of the material; hence the only way to affect the temperature-sensitivity of $\alpha$ is through the selection of the wavelength of the light which is being employed.

These dependencies can be described as follows:

The temperature-dependence of $E_g$ is $$E_g = E_o - k(T - T_o) \quad (2)$$

wherein $E_g$ is the bandgap at the temperature of interest, T; $E_o$ is the bandgap at some initial temperature, $T_o$ (often the absolute zero), and k is characteristic of the given material and is assumed to be invariant over the temperature range of interest.

The functional form of the optical absorption coefficient $\alpha$ can be approximated as follows for a direct bandgap material:

$$\alpha = A(hv - E_g)^{\frac{1}{2}}, \text{ when } hv > E_g, \quad (3)$$

where A is a constant, and hv is the energy of the incident light {h is Planck's constant and v is the photon frequency}.

Combining equations (2) and (3) yields the dependence of $\alpha$ on the temperature:

$$\alpha = A[hv - E_o + k(T - T_o)]^{\frac{1}{2}}, \quad (4)$$

Figure 2:
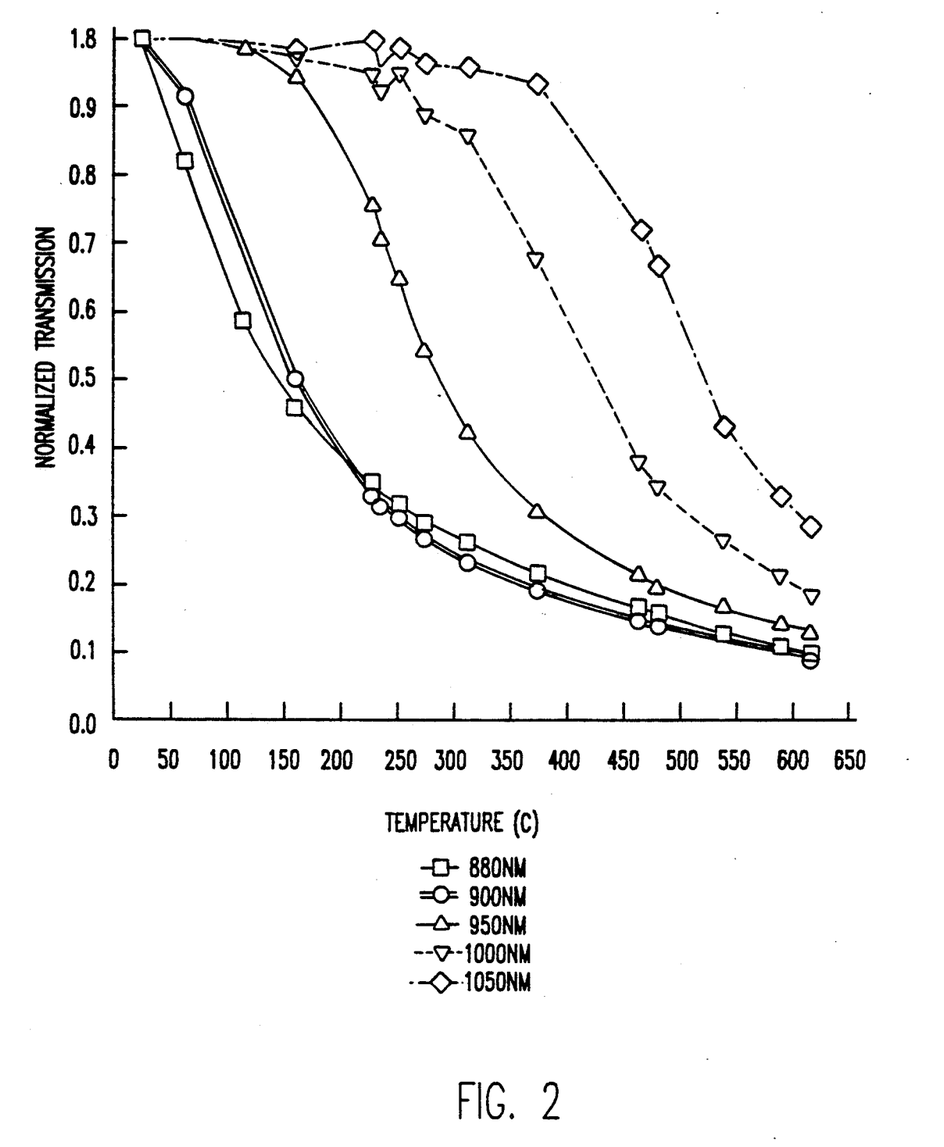
FIG. 2 is a plot showing the normalized optical transmissions during calibration.

It is apparent from Equations 1 through 4 that the sensitivity of the transmittance to changes in temperature is greatest when hv is only slightly greater than $E_g$, and that it diminishes as the temperature T rises and the difference between hv and $E_g$ increases. If hv is selected to be near $E_g$ at the initial temperature, and subsequently the sample is heated, then the sensitivity of the transmittance to temperature, while initially large, decreases. The generic behavior of bandgap with temperature, and the concomitant behavior of the optical transmittance, are shown in FIGS. 1a and 1b. A typical curve demonstrating the dependence of the optical transmittance on temperature is shown in FIG. 2. This behavior is apparent intuitively: if hv is much larger than $E_g$, then the changes of $E_g$ with temperature will be hardly noticed and the values of $\alpha$ will not show sensitivity to variation in temperature. On the other hand, if hv is just slightly larger than $E_g$, then very small changes in $E_g$ (due to temperature) will manifest themselves strongly in changes in $\alpha$ thus making the present method a sensitive as well as precise thermometer.

The specific behavior of the band-to-band optical absorbance is shown in FIG. 2, where the normalization of the data is referred to the absorbance at room temperature, and the wavelength chosen was 850 nanometers—which represents optical energy higher than the bandgap at all temperatures. It is particularly noteworthy that, as predicted by Equation 4, the sensitivity of the absorbance to temperature decreases with increase in temperature.

Figure 3:
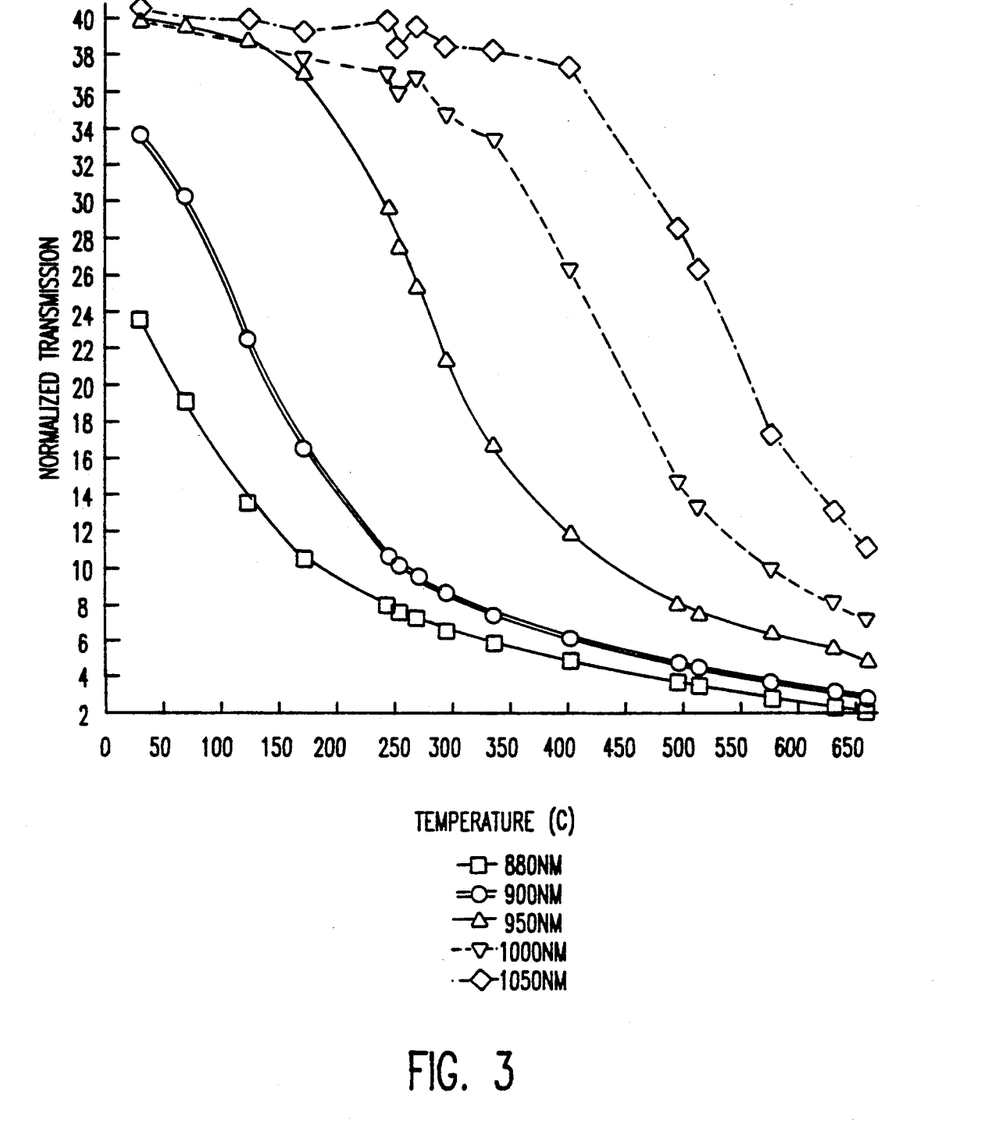
FIG. 3 is a plot showing optical transmissions of multiple wavelengths as a function of the temperature of a GaAs layer.

FIG. 3 shows a further example of the relation of the optical energy (or wavelength) to the sensitivity of the absorbance to temperature, where the prediction of Equation 4 is demonstrated further: the sensitivity of the absorbance to temperature is greatest when the optical energy is closest to the band-edge (and slightly above it). As the optical energy moves progressively above the band-edge, either by going to shorter wavelengths or due to the narrowing of the bandgap at higher temperatures, the sensitivity of the absorbance to changes in temperature decreases.

Figure 4:
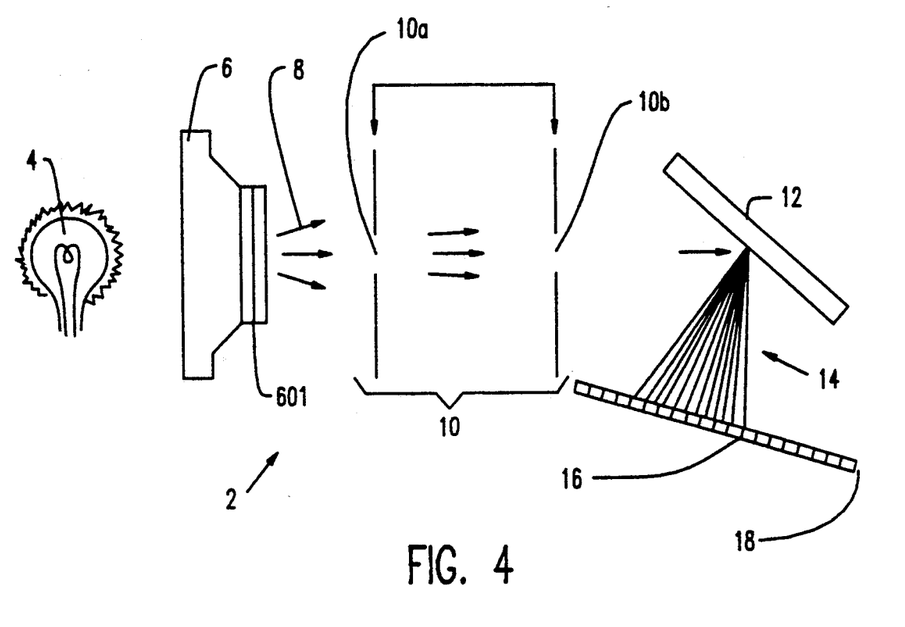
FIG. 4 is a schematic illustration showing application of multiwavelengths transmission in a preferred manner of practicing this invention.

FIG. 4 demonstrates one way to accomplish the heart of this invention, that is, one way to maximize the sensitivity of the absorbance to temperature. Here, the temperature of the sample 6 is monitored by measuring the optical transmission properties of a group of wavelengths (all corresponding to optical energies slightly above the bandgap). The source of optical radiation 4 is an incandescent bulb used to heat clean a photocathode. It is aligned with a plurality of slits 20a, 10b arranged to substantially collimate the light. The sample 6, which comprises a layer 601 of a material having a direct bandgap which varies as a function of temperature, GaAs in this example, is placed so as to intercept the light between the bulb 4 and the slits 10. Thus, the light passing through the slits 10 has traversed the layer 601 of GaAs. A diffraction grating 12 (a holographic, blazed grating in this example, though any dispersive element could be used) is placed at an angle to the collimated light beam exiting slits 10 such that the light is dispersed, in a dispersed beam 14, onto the optical detector 18 which in this example is a linear detector array. The low frequency cutoff 16 is detected by the optical detector thus permitting temperature detection according to the procedures described with respect to the prior examples. Additional benefits can be obtained by the use of a detector capable of isolating a plurality of discrete wavelengths of optical energy. Since the functional dependence of $\alpha$ on $(hv - E_g)$ [see Eq. 3] includes the magnitude of $(hv - E_g)$ [it approaches the asymptotic form $\alpha = A(hv - E_g)^{\frac{1}{2}}$], such an array would optimize the sensitivity of the method in different temperature ranges and will enhance the precision (which depends on normalization at room temperature).

Figure 5:
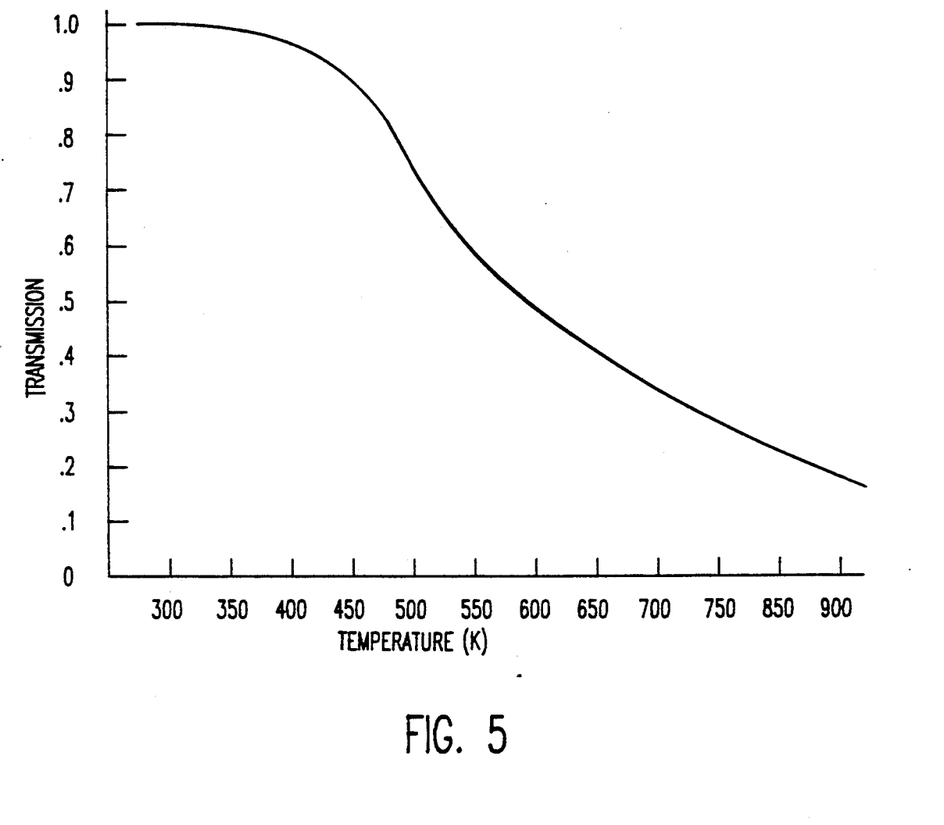
FIG. 5 is a plot showing the optical transmission as a function of temperature for the present invention.

The ultimate sensitivity and the precision of this method as a thermometer depends both on the sensitivity of the absorbance to temperature at the desired "ultimate" temperature, and on the precision of the normalization measurement at the initial temperature. FIG. 5 shows a way to enhance the accuracy of the method of this invention by selecting two different absorption processes at the two ends of the temperature range: at the lower, normalizing temperature, absorption by free-carriers is chosen because it is less temperature-sensitive than band-to-band absorption. Whenever the initial temperature is lower than the final temperature-to-be-controlled, then the temperature-sensitivity of band-to-band absorption at that initial temperature is greater. This is the reason for the need to take into account the sensitivities and the precision of the method at both temperatures. These considerations have been summarized in equations 5 through 10 below, and reasons are given for choosing a wavelength which is long and which represents optical energy below the bandgap at the normalizing temperature. As the temperature of the sample is increased and its bandgap narrows, the above optical energy gets to be above the bandgap and the band-to-band absorption process dominates. The generic plot of optical absorption as function of temperature for this method is shown in FIG. 5. This method has indeed been found to give excellent results, without the need for extremely tight temperature control at the initial normalizing temperature.

An example of an alternative implementation of a selected wavelength or a group of wavelengths is the utilization of lasers (or light-emitting-diodes). This particular manner of implementing the invention, with the use of many wavelengths, will yield the benefits which are ascribed in the original patent to a diffraction grating (U.S. Pat. No. 4,890,933; FIG. 9). This method of implementation is shown in FIGS. 6 and 7, as it applies to transmission and reflection, respectively.

Figure 6:
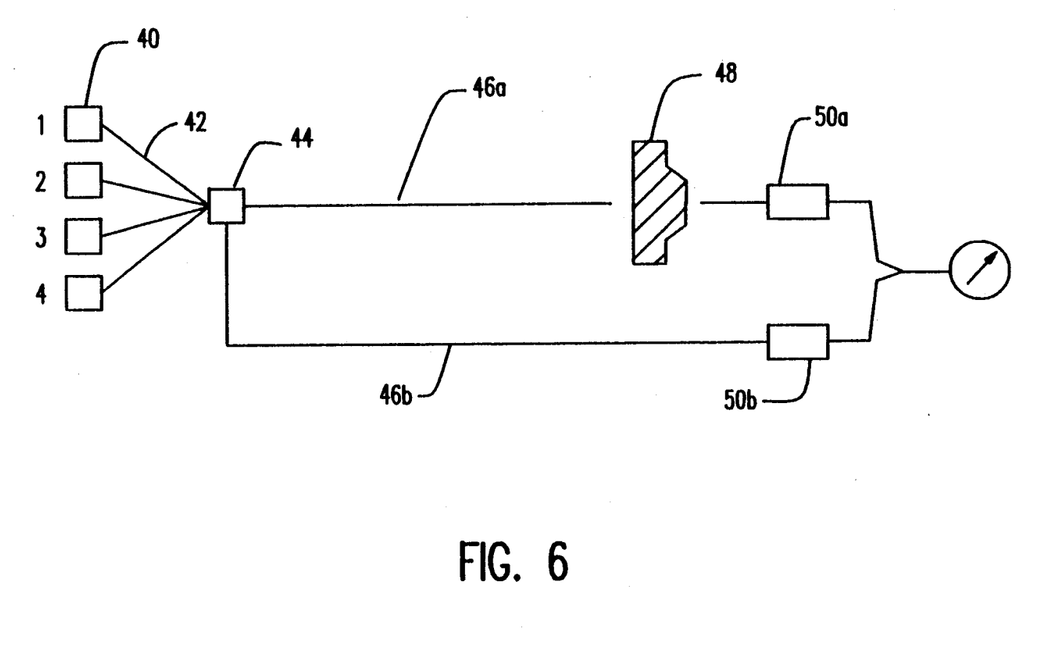
FIG. 6 is a schematic illustration of another preferred manner of practicing the invention.

As shown in FIG. 6, the light source is either a single modulated laser 40, such as laser No. 1 emitting light at wavelength $\lambda_1$; or an array of modulated lasers 20, such as lasers numbered 1 through i emitting light at wavelengths $\lambda_1$ through $\lambda_i$, respectively. Each laser is modulated at its own specific wave pattern. The laser output 42 passes through a coupler 44 into two optical fibers 46a, 46b: one fiber 46a serves as the "sample channel" and transmits the light through the sample workpiece 48, while the other fiber 46b serves as the "reference channel". Two detectors 50a, 50b, tuned to the wavelength $\lambda_1$ (or wavelengths $\lambda_1$ to $\lambda_i$), and to the specific wave pattern modulation of the appropriate laser, are located in the path of the "sample channel" and the "reference channel", respectively. This will enable the simultaneous yet separate detection of the array of wavelengths. The two detectors compare the two signals in the manner of FIG. 7 in the original U.S. Pat. No. 4,890,933.

Figure 7:
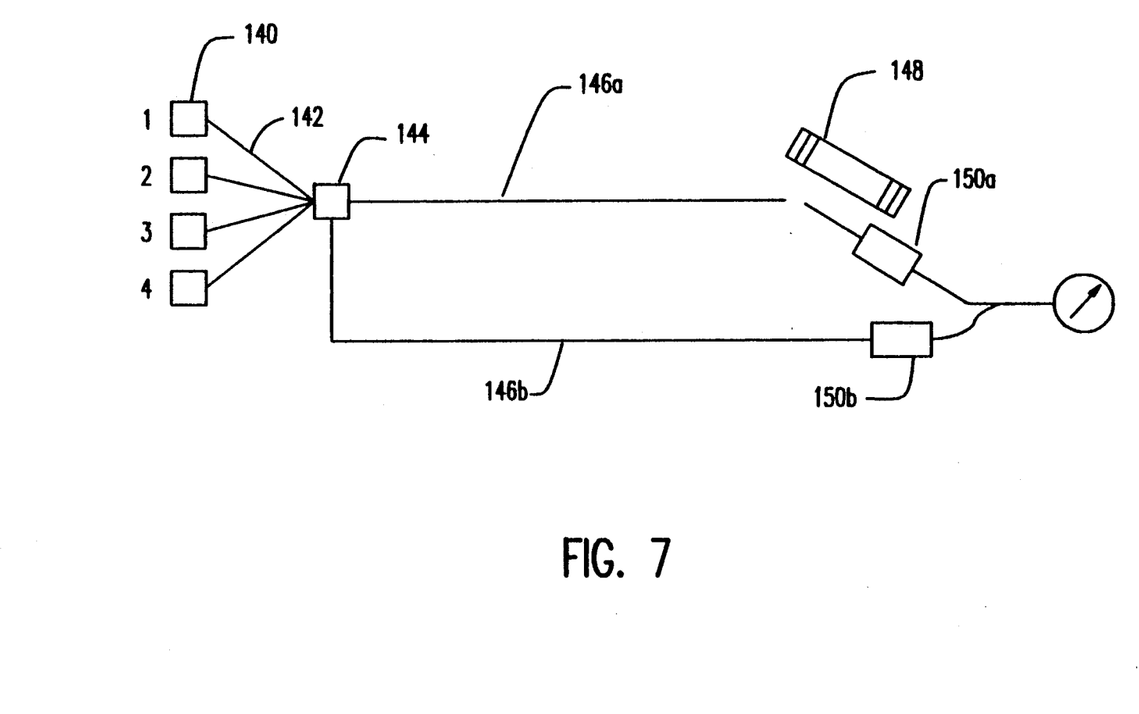
FIG. 7 is a schematic illustration of still another preferred manner of practicing the invention.

Another implementation of the selected wavelength or a group of wavelengths is shown with the elements illustrated in FIG. 7 which correspond to the elements described above with respect to FIG. 6. The elements in FIG. 7 have been designated by corresponding reference numerals increased by one hundred. The implementation in FIG. 7 of the selected wavelength or wavelengths is for use in the same manner as the implementation of FIG. 6 unless otherwise stated. As can be seen in FIG. 7, the fiber 146a serves as the "sample channel" and transmits the light to reflect off of the sample workpiece 148. The advantage of this will be enhanced sensitivity at all temperatures.

FIGS. 8 and 9 show calibration runs at normalized and unnormalized transmissions respectively. In FIG. 8, optical energy is transmitted at wavelengths of 880, 900, 950, 1000, and 1050 nanometers to obtain a plot of each wavelength as a function of temperature. In FIG. 9, optical energy at the same wavelengths was transmitted to obtain a plot of each wavelength as a function of temperature. The difference in FIG. 9 is that the optical transmission is not calibrated, or is unnormalized and, therefore, accuracy of the temperature of the bandgap material is reduced.

As seen above, the maximum sensitivity to temperature is achieved at those wavelengths for which hv is just slightly larger than $E_g$. The separation between hv and $E_g$ will change as the temperature changes, so that one criterion for selecting the optical energy (i.e. wavelength) has to be some average based on the extremes of the relevant temperature range. Yet the operating wavelength cannot be selected on the basis of this criterion alone, because of the need to "normalize" the transmission through the sample at some given initial temperature, $T_n$. In other words, employment of this method as a thermometer depends on monitoring the change in the transmittance between some initial "normalizing temperature", $T_n$, and the desired measured temperature T. What is measured is the ratio of the transmittance I(T) at temperature T, to the initial transmittance $I(T_n)$ at the "normalizing temperature" $T_n$.

The fundamental relationship for this method of thermometry is:

$$\alpha(T_n) - \alpha(T) = \frac{\ln\left(\frac{I(T)}{I(T_n)}\right)}{t} \tag{5}$$

If the dependence of $\alpha$ on temperature is due to band-to-band transitions, then (for the case where the bandgap narrows as the temperature increases) at the low initial temperature $T_n$ we will have hv slightly greater than $E_g$, with a relatively low value of $\alpha$ which is very temperature-sensitive, and as we increase the temperatures, $\alpha$ becomes larger and less sensitive to temperature.

As seen in FIG. 2, the influence of changes in temperature on the transmission values I(T) will be larger at the lower normalizing temperature $T_n$ than at the higher temperature T.

Yet, the two must be considered together, because the calibration curves of transmission vs. temperature depend on the ratio $I(T)/I(T_n)$. The latter dependence leads to the result that the sensitivity of the method to temperature variations, both at $T_n$ and T, is given by:

$$\frac{d\left(\frac{I(T)}{I(T_n)}\right)}{\frac{I(T)}{I(T_n)}} = -t\left(\frac{\partial \alpha}{\partial T} dT - \frac{\partial \alpha}{\partial T_n} dT_n\right) \tag{6}$$

This equation shows that under the best circumstances, when $$\frac{d\left(\frac{I(T)}{I(T_n)}\right)}{\frac{I(T)}{I(T_n)}} = 0 \tag{7}$$

-continued then $$\frac{\partial \alpha(T)}{\partial T} dT = \frac{\partial \alpha(T_n)}{\partial T_n} dT_n \tag{8}$$

When the coefficient-of-absorption $\alpha$ represents band-to-band absorption (see Equation 4) over the full temperature range of interest, then the condition of Equation 7 becomes:

$$\frac{\alpha(T)}{\alpha(T_n)} = \frac{dT}{dT_n} \tag{9}$$

This last equation states that if $\alpha$ is expressed by Equation 4 throughout the temperature range, then a change $dT_n$ at the normalizing temperature will cause a change $dT$ at the measured temperature, such change being $[\alpha(T)/\alpha(T_n)]dT_n$. Since $\alpha(T) > \alpha(T_n)$ (because $T > T_n$) we shall always have $dT > dT_n$.

This demonstrates that any temperature uncertainty at $T_n$ will be magnified at the higher temperature T, whenever band-to-band absorption is the sole mechanism over the full temperature range.

FIG. 3 shows the temperature-dependence of transmittance at four different wavelengths during their respective calibration runs. It is seen from the curves of FIGS. 2 and 3 that the sensitivity of the transmittance to sample temperature decreases with rising temperature. This is due to the fact that the temperature dependence of $\alpha$ decreases as the light energy increases with respect to the band edge (see Equation 4). Consequently, any constant light energy hv which is selected, will be further removed from the band edge as the bandgap shrinks due to rise in temperature. As a result, the temperature sensitivities of $\alpha$ as well as of I(T) will decrease.

Since the method of this application depends on continual comparison of the transmittance I(T) at temperature T, to the "normalizing transmittance" I($T_n$) at temperature $T_n$, it is apparent that any error in the reading of the normalizing temperature $T_n$ will be magnified at higher temperatures.

The selection of the proper wavelength is critical, and has to be made so that the sensitivity to temperature of the high-temperature reading, in terms of the combined sensitivities of the high-temperature measurements and the "normalizing temperature" measurements, will be acceptable. It was shown earlier that as long as the selected light energy, hv, is above the bandgap at the normalizing temperature, then the sensitivity of $\alpha(T_n)$ to variations in $T_n$ will exceed that of $\alpha(T)$ to variations of the higher temperature T. And as a consequence, any uncertainties in the exact values of the "normalizing temperature" will throw off the measurements at the higher temperature {which measurements depend on, I(T)/I($T_n$)}. One way to overcome this problem is to maintain extremely accurate control of the normalizing temperature—both in the constancy of the ambient temperature and in avoiding heating the material by the sampling light. The proper light energy hv (i.e. the wavelength), then, needs to be selected by choosing the proper compromise between the sensitivity of I($T_n$) to instabilities in $T_n$, and the sensitivity of I(T) to variations in T at the high end, and, of course, the sensitivity to T of I(T)/I($T_n$). For any material, such as GaAs, wherein the bandgap shrinks with increasing temperature, the sensitivity of I($T_n$) to $T_n$ will exceed that of I(T) to T—for all values of hv which exceed the bandgap.

An alternative method of selecting the spectrum of the light is to combine a few wavelengths, to measure the transmission of each wavelength on a distinct element of a linear array, and to adopt software which combines the values of I(T)/I($T_n$) at the various wavelengths, to extract the best sensitivity of that parameter. The manner of doing so is demonstrated in FIGS. 4, 6, and 7.

Yet another approach to select the proper light energy may be found by choosing a wavelength for which the absorption at the normalizing temperature $T_n$ has a much lower dependence on temperature than it does at higher temperatures. A way to do so is to select light of energy hv which is smaller than the bandgap at the normalizing temperature $T_n$. Such light will not be absorbed by the process of electron-hole generation across the gap, but by the process of free-carrier absorption. The absorption coefficient for free-carrier absorption, $\alpha(fc)$, can be approximated by the following expression:

$$\alpha(fc) = \frac{N\lambda_0^2 e^3}{4\pi^2 \epsilon_0 m^2 c^2 n \mu} \tag{10}$$

where N is the concentration of free-carriers, $\lambda_o$ is the free-space wavelength, e is the electronic charge, $\epsilon_o$ is the permittivity of free space, m is the effective-mass of the free-carrier, c is the velocity of light in free space, n is the refractive index of the material, and $\mu$ is the conductivity-mobility of the free carriers (the temperature dependence of this mobility decreases at very high impurity concentrations due to the onset of degeracy). The difference between this free-carrier absorption coefficient, and the absorption coefficient for band-to-band absorption (see Equation 4) is apparent.

The absorption coefficient for the free carrier absorption process is weaker than that for the band-to-band process, as is its temperature-dependence. A consequence of the latter property is that the normalizing temperature $T_n$ does not have to be held so tightly. The generic curve of the transmission process where hv at $T_n$ is smaller than $E_g$ at $T_n$ is shown in FIG. 5. The advantage of this is that not only is the method fairly robust against errors caused by uncertainties at the normalizing temperature $T_n$, but the sensitivity of the transmission at the final temperature T is enhanced—since this value of hv is closer to the bandgap and thus is more sensitive to the temperature.

We claim:

1. A method for selecting a frequency of optical energy to be transmitted through a bandgap material to determine the temperature of said bandgap material wherein said frequency is selected from optical energy having a plurality of frequencies, comprising the steps of:

subjecting said bandgap material to a first temperature ($T_n$) for a sufficient period of time at each of said plurality of frequencies for providing a normalizing temperature for each of said plurality of frequencies;

subjecting said bandgap material to a second temperature (T) for a sufficient period of time at each of said plurality of frequencies for providing a desired temperature for each of said plurality of frequencies;

measuring the transmittance between said first ($T_n$) and second (T) temperatures at each of said plurality of frequencies for providing a ratio for each of said plurality of frequencies; and selecting a frequency which produces a maximum ratio between said first ($T_n$) and second (T) temperatures wherein said selected frequency is transmitted through said bandgap material to determine the temperature of said bandgap material.

2. A method for detection of the temperature of a bandgap material according to claim 1, wherein said frequency is provided having photon energy slightly higher than the bandgap energy.

3. A method for detection of the temperature of a bandgap material according to claim 1, wherein said frequency is provided having photon energy lower than the bandgap energy at a specific temperature.

4. A method for detection of the temperature of a bandgap material according to claim 1, wherein said frequency is selected from optical energies provided having photon energies above and below the bandgap energy.

5. A method for detection of the temperature of a bandgap material according to claim 1, wherein said step of providing frequency includes the provision of optical energy having a color spectrum and wherein said step of receiving said optical energy employs a detector array located for receiving optical energy reflected from a dispersive element such as a grating.

6. A method for detection of the temperature of a bandgap material according to claim 1, wherein said step of providing frequency includes the provision of optical energy having a set of discrete wavelengths, modulated independently, and wherein said step of receiving said optical energy employs detectors located for receiving the optical energy and demodulating the various wavelengths.

7. A method for detection of the temperature of a bandgap material according to claim 1, wherein said step of providing frequency includes the provision of optical energy below said bandgap at the initial temperature but which becomes above said bandgap as said temperature is raised.

8. A method for detection of the temperature of a bandgap material according to claim 1, wherein said material is GaAs.

9. A method for selecting a frequency of optical energy to be transmitted through a bandgap material to determine the temperature of said bandgap material, comprising subjecting said bandgap material to an elevated temperature and to room temperature and selecting a frequency from a plurality of frequencies from said optical energy which has the greatest sensitivity to said material at said elevated temperature while exhibiting a relatively low sensitivity at said room temperature.

* * * * *